United States Patent [19]

Radford et al.

[11] Patent Number: 5,264,169
[45] Date of Patent: Nov. 23, 1993

[54] SURGE STABILITY IMPROVEMENT OF ZINC OXIDE VARISTOR DISCS

[75] Inventors: Kenneth C. Radford, North Huntingdon, Pa.; Robert G. Johnson; Andrew S. Sweetana, Jr., both of Bloomington, Ind.

[73] Assignee: Electric Power Research Institute, Inc., Palo Alto, Calif.

[21] Appl. No.: 690,092

[22] Filed: Apr. 23, 1991

Related U.S. Application Data

[63] Continuation-in-part of Ser. No. 452,267, Dec. 15, 1989, abandoned.

[51] Int. Cl.⁵ .................... C04B 41/80; B29C 71/00
[52] U.S. Cl. ................................ 264/66; 264/235
[58] Field of Search .............. 264/61, 66, 56, 104, 264/235; 252/518; 338/20, 21

[56] References Cited

U.S. PATENT DOCUMENTS

| | | | |
|---|---|---|---|
| 3,903,226 | 9/1975 | Iga et al. | 264/66 |
| 4,046,847 | 9/1977 | Kresge | 264/61 |
| 4,094,061 | 6/1978 | Gupta et al. | 264/66 |
| 4,219,518 | 8/1980 | Philipp | 264/66 |
| 4,243,622 | 1/1981 | Kresge | 264/66 |
| 4,725,807 | 2/1988 | Tsuda et al. | 252/517 |
| 5,165,351 | 8/1979 | May | 264/66 |

*Primary Examiner*—Jan H. Silbaugh
*Assistant Examiner*—Christopher A. Fiorilla
*Attorney, Agent, or Firm*—Flehr, Hohbach, Test, Albritton & Herbert

[57] ABSTRACT

A method of manufacturing a varistor utilizes preselected amounts of ZnO which are combined with specified amounts of additives including B, Na, $Bi_2O_3$ and BaO to form a variety of compositions. Each composition is pressed into a disc. The disc is then sintered at a first selected temperature. Afterwards, the disc is annealed at a second selected temperature. The specific compositions disclosed render a varistor with improved high temperature performance when the annealing step is followed with a low temperature tempering cycle at approximately 250° C.

5 Claims, 1 Drawing Sheet

SURGE STABILITY IMPROVEMENT OF ZINC OXIDE VARISTOR DISCS

REFERENCES TO PRIOR PATENTS

This is a continuation in part of U.S. patent application Ser. No. 07/452,267, now abandoned Dec. 15, 1989.

BACKGROUND OF THE INVENTION

1. Field of the Invention

The invention relates to varistors and more particularly to varistors having improved energy absorption characteristics.

2. Description of the Prior Art

Varistors using elements formed of ZnO in combination with other elements are the basis for all modern varistor designs. During service, the varistors continuously draw a small leakage current. During transient voltage conditions which increase the voltage stress to which the varistor is subjected, the current increases. This converts a sufficient amount of electrical energy to heat, to limit the amplitude of voltage surges to an acceptable value. However, the electrical behavior of varistors is very sensitive to temperature. For example, at a high temperature the current at a constant voltage stress typically irreversibly increases exponentially.

In service, typical varistors are operated at a voltage stress in the region of 0.4 to 0.8 $E_{0.5}$. ($E_{0.5}$ is the voltage stress at which 5 ma. per cm$^2$ flows through the varistor). During surge conditions, which increase the voltage stress to which the varistor is subjected, energy absorption increases causing the temperature of the varistor to increase in direct relation to the amount of energy absorbed. A typical relation is a temperature increase in the order of 10° C. per 40 J/cc absorbed. Since the voltage surge is transient, the varistor is heated but the voltage stress returns to normal after a short time interval. However, the leakage current will have increased as a result of the transient, due to the additional heating caused thereby. Each subsequent transient which results in an increase in the temperature of the varistor further increases the leakage current. These incremental increases in current are an important factor determining the life of a varistor.

The varistor action is related to the defect state at the boundaries of the ZnO grains. These defects are due to the levels and type of additives (materials other than ZnO) included in the mixture used to make the varistor disc. The defect structures are in a semi-equilibrium state and are subject to increases in mobility as the temperature rises. Consequently, even though the varistor may be stable indefinitely at normal operating temperature and voltage stress, at an elevated temperature these defects can be unstable, causing the varistor current to increase and thereby increasing the amount of electrical energy absorbed, further heating the varistor. This condition rapidly becomes uncontrollable, resulting in an exponentially increasing current and failure of the varistor.

SUMMARY OF THE INVENTION

Varistors are constructed by combining ZnO with suitable additives to form a mixture which is sintered to form the varistor disc. The discs are appropriately packaged to form the completed varistor.

Considerable effort is presently being devoted by those active in the art to improve the high temperature stability of varistors. One technique is to modify the composition of the mixture in search of a combination of materials which improves the high temperature stability. Unfortunately, these efforts to improve the high temperature stability often have undesirable effects on the other electrical properties, notably $E_{0.5}$. Sintering schedules are also frequently modified in an effort to find a sintering process which improves the high temperature stability of the varistor. Often this technique also has an adverse economic effect due to the extended time required to perform the sintering operation. Volatility of frequently used additives also limits the usable sintering temperature.

Varistors manufactured in accordance with the disclosed invention substantially ameliorate these problems associated with prior art varistors. The disclosed invention comprises selecting the additives combined with the zinc oxide to form the mixture, coupled with a predetermined low temperature tempering cycle following the sintering process, to produce a varistor having an increased high temperature stability.

DETAILED DESCRIPTION

Figure 1:
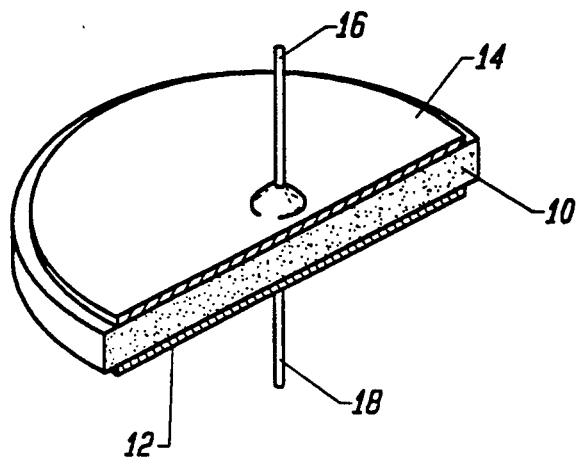
FIG. 1 is a drawing illustrating a typical varistor.

A typical varistor is illustrated in cross-section in FIG. 1. The varistor includes a disc 10 having electrodes, 12 and 14, attached to opposed sides thereof. Leads, 16 and 18, are attached to the electrodes permitting the varistor disc to be connected to the circuit in which it is to be used.

A varistor operates by absorbing high levels of energy during voltage transient conditions, which increase the voltage stress to which the varistor is subjected, to limit the amplitude of voltage transients. To function in this manner, the varistor is connected across the voltage source and designed to normally operate at about 0.4 to 0.8 $E_{0.5}$. At this voltage stress, the varistor is sufficiently cool to maintain an essentially constant current flow and power dissipation level indefinitely.

Figure 2:
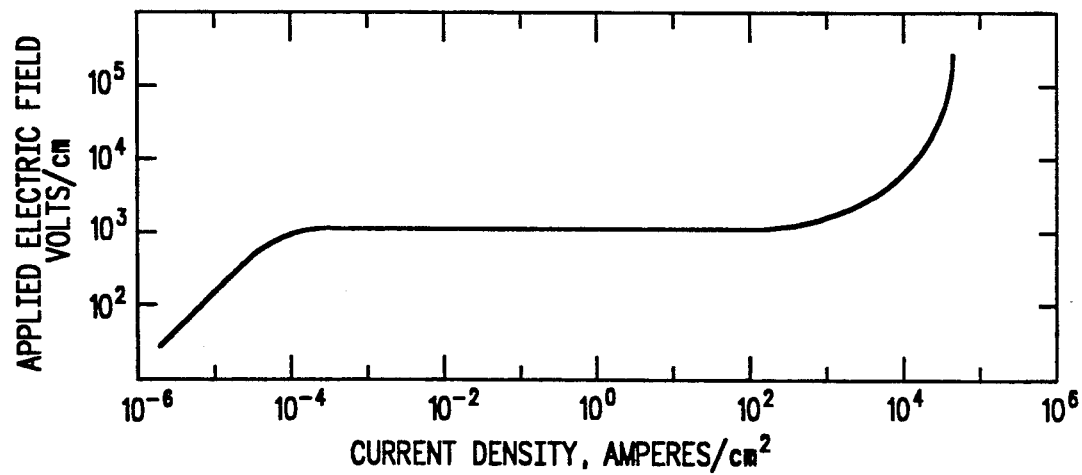
FIG. 2 is a drawing illustrating the voltage current characteristic of a typical varistor.

Under these conditions, the current flow through the varistor is low. However, during transient conditions and the associated increasing voltage stress, the current increases at a very high rate, causing the varistor energy absorption level to increase and thus limit the amplitude of the voltage transient. The voltage current characteristics of a typical varistor are illustrated in FIG. 2. This figure clearly shows the rapidly increasing current with small increases in the applied voltage stress as the voltage stress exceeds $E_{0.5}$.

As the energy absorption of the varistor increases, the temperature of the varistor also increases. It is well known in the art that at an operating temperature as low as 250° C. the current flow through a varistor at constant voltage stress irreversibly increases at an exponential rate. Stated another way, upon cooling the current flow does not decrease to its original value. This characteristic has two undesirable effects. The increase in current may increase power dissipation sufficiently to thermally destroy the varistor. If the varistor remains operative, the cumulative effect of short term increases in the temperature of the varistor may be such that the current increases to a non-acceptable level at normal operating voltage stress, thus destroying the effectiveness of the varistor. The disclosed invention reduces these problems by providing a varistor having improved high temperature stability characteristics.

During development of the invention, varistors were made by the usual method involving milling and combining compositions of ZnO, $Bi_2O_3$, $Sb_2O_3$, $MnO_2$, $Co_3O_4$, $SiO_2$ and lower the levels of additives including B, $Al_2O_3$ and K to form a mixture. The mixture was spray dried and pressed into discs 2¼ inches in diameter by ¼ inch thick disc and sintered at a selected temperature, lapped, annealed (tempered) and electrically tested.

The tests were originally performed using a limited number of sample varistors. These samples were sintered at 1100° C. for 10 hours and annealed at 600° C. for 2 hours. Selected varistors were annealed again (tempered) at 250° C. for 1, 4 and 16 hours resulting in high temperature stabilities of 305, 350 and 114 minutes. Samples not tempered exhibited high temperature stabilities of 89 minutes. Other samples were tempered at 350° C. for one hour, resulting in high temperature stabilities of 257 minutes. The tests were repeated with various mixtures having varying amounts of the principal additives (materials other than zinc oxide) to determine the critical values associated with these mixtures. Other sample varistors were sintered at 1300° C. and annealed as described above. The results of these experiments are tabulated below, showing the stabilities associated with and without the additional tempering step at a constant temperature of 250° C.

| COMP | B (ppm) | Na (ppm) | $Bi_2O_3$ (m/o) | BaO | TEMP (mins) | NO TEMP (mins) |
|---|---|---|---|---|---|---|
| Sintered at 1100° C. | | | | | | |
| 380 | 30 | 200 | 3.0 | 0 | 5 | 15 |
| 388 | 30 | 0 | 3.0 | 0 | 35 | 14 |
| 827 | 30 | 0 | 1.25 | 0 | 18 | 8 |
| 836 | 30 | 0 | 2.0 | 0 | 8 | 10 |
| 912 | 200 | 200 | 3.0 | 0 | 46 | 39 |
| Sintered at 1300° C. | | | | | | |
| 380 | 30 | 200 | 3.0 | 0 | 1 | 2 |
| 388 | 30 | 0 | 3.0 | 0 | 1 | 11 |
| 827 | 30 | 0 | 1.25 | 0 | 34 | 11 |
| 836 | 30 | 0 | 2.0 | 0 | 1 | 10 |
| 912 | 200 | 200 | 3.0 | 0 | 12 | 21 |
| 914 | 30 | 200 | 2.0 | 0 | 19 | 19 |
| 918 | 200 | 200 | 1.25 | 0 | 4 | 13 |
| 920 | 200 | 200 | 2.0 | 0 | 120 | 63 |
| 951 | 200 | 200 | 1.0 | 0.5 | 350 | 239 |
| 952 | 200 | 200 | 1.25 | 0.5 | 350 | 150 |
| 961 | 200 | 200 | 0.87 | 0.5 | | 2 |

These test results demonstrate that the tempering cycle is extremely beneficial, especially when the additives are judiciously selected. These experiments also demonstrate that sintering temperatures of 1300° C. with high levels (>2 M/O) of $Bi_2O_3$, and low levels of BaO are deleterious. However, these experiments also show that the sintering process is composition sensitive. For example, with use of predetermined concentrations of $Bi_2O_3$, B, and Na, the tempering cycle produces dramatic increases in the high temperature stability of the varistor. Specifically, at a sintering temperature of 1300° C. and concentrations of 200 ppm of B, 200 ppm of Na, 1.25 M/O of $Bi_2O_3$ and 0.5 M/O of BaO in combination with a sintering temperature of 1300° C. and a tempering cycle in the range of 2 hours at 250° C. the high temperature stability increased from 150 to 350 minutes.

We claim:

1. A method of manufacturing a varistor, including the steps of:
   (a) combining a preselected amount of ZnO with other additives including 200 ppm of B, 200 ppm of Na, 1.00 to 1.25 mole percent of $Bi_2O_3$ and 0.5 mole percent BaO to form a mixture;
   (b) pressing a predetermined quantity of said mixture to form a disc;
   (c) sintering said disc at a temperature of 1300° C.;
   (d) subsequent to sintering, annealing said disc at a temperature of 600° C. for 2 hours; and
   (e) subsequent to annealing, subjecting said disc to a tempering cycle at 250° C. for two hours thereby increasing the high temperature stability of said varistor.

2. A method of manufacturing a varistor, including the steps of:
   a) combining a preselected amount of ZnO with other additives including 30 ppm of B and 3.0 mole percent of $Bi_2O_3$ to form a mixture without sodium.
   b) pressing a predetermined quantity of said mixture into a desired shape to form a disc;
   c) sintering said disc at a first selected temperature of 1100° C.;
   d) subsequent to sintering, annealing said disc at a second selected temperature of 600° C.; and
   e) subsequent to annealing, subjecting said disc to a tempering cycle at a temperature of 250° C., thereby increasing the high temperature stability of said varistor.

3. A method of manufacturing a varistor, including the steps of:
   a) combining a preselected amount of ZnO with other additives including 30 ppm of B and 1.25 mole percent of $Bi_2O_3$ to form a mixture;
   b) pressing a predetermined quantity of said mixture into a desired shape to form a disc;
   c) sintering said disc at a first selected temperature between 1100° C. and 1300° C.;
   d) subsequent to sintering, annealing said disc at a second selected temperature of 600° C.; and
   e) subsequent to annealing, subjecting said disc to a tempering cycle at a temperature of 250° C., thereby increasing the high temperature stability of said varistor.

4. A method of manufacturing a varistor, including the steps of:
   a) combining a preselected amount of ZnO with other additives including 200 ppm of B, 200 ppm of Na, and 3.0 mole percent of $Bi_2O_3$ to form a mixture;
   b) pressing a predetermined quantity of said mixture into a desired shape to form a disc;
   c) sintering said disc at a first selected temperature of 1100° C.;
   d) subsequent to sintering, annealing said disc at a second selected temperature of 600° C.; and
   e) subsequent to annealing, subject said disc to a tempering cycle at a temperature of 250° C., thereby increasing the high temperature stability of said varistor.

5. A method of manufacturing a varistor, including the steps of:
   a) combining a preselected amount of ZnO with other additives including 200 ppm of B, 200 ppm of Na, and 2.0 mole percent of $Bi_2O_3$ to form a mixture;
   b) pressing a predetermined quantity of said mixture into a desired shape to form a disc;

c) sintering said disc at a first selected temperature of 1300° C.;
d) subsequent to sintering, annealing said disc at a second selected temperature of 600° C.; and
e) subsequent to annealing, subjecting said disc to a tempering cycle at a temperature of 250° C., thereby increasing the high temperature stability of said varistor.

* * * * *